Patented Sept. 1, 1931

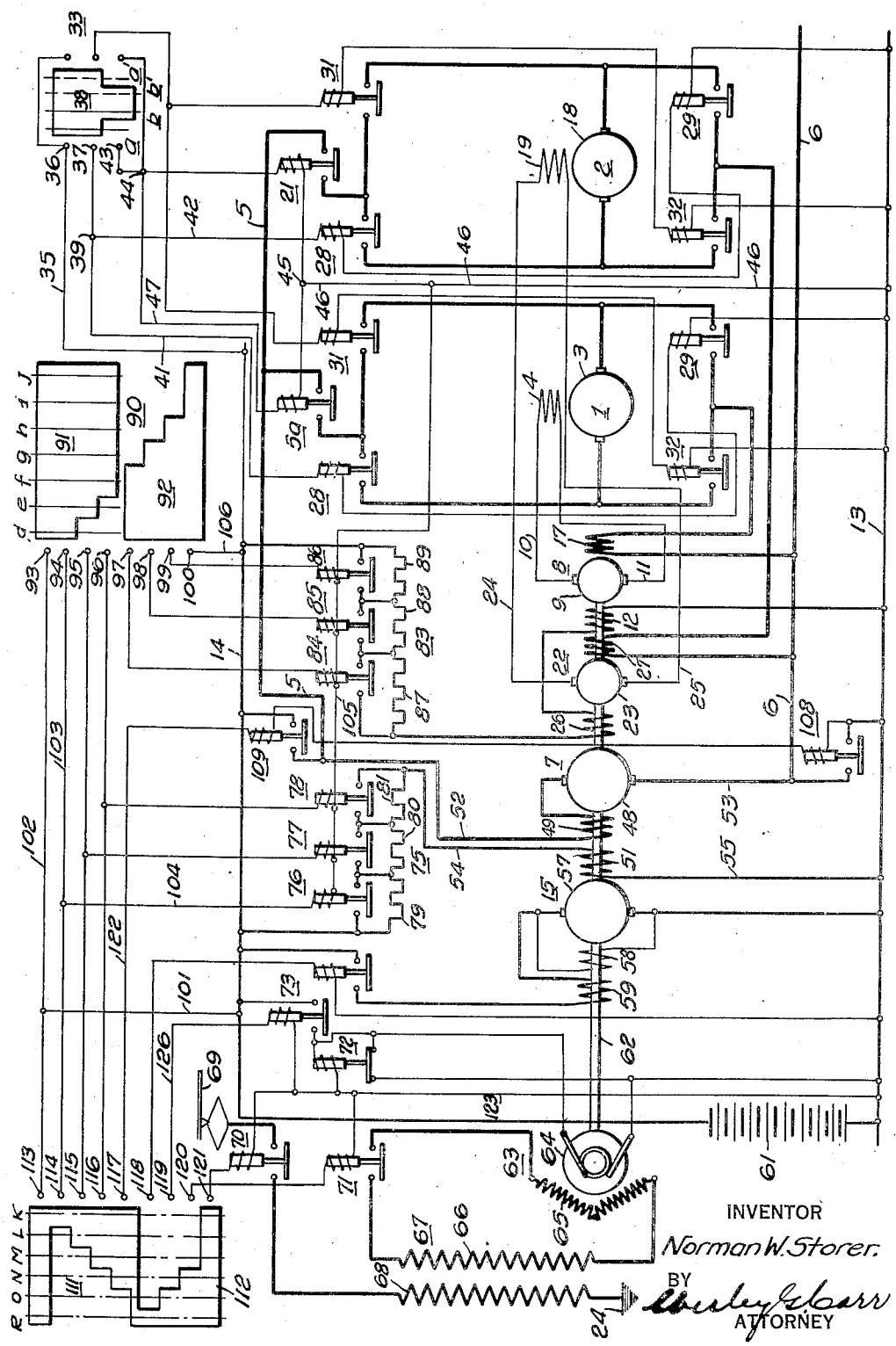

1,821,364

UNITED STATES PATENT OFFICE

NORMAN W. STORER, OF PITTSBURGH, PENNSYLVANIA, ASSIGNOR TO WESTINGHOUSE ELECTRIC & MANUFACTURING COMPANY, A CORPORATION OF PENNSYLVANIA

MOTOR GENERATOR LOCOMOTIVE CONTROL SYSTEM

Application filed August 22, 1928. Serial No. 301,286.

This invention relates to motor vehicles and particularly to control systems therefor.

An object of the invention is to provide a control system for motor vehicles that shall be simple in construction, efficient in its operation and easily manufactured and installed.

Another object of the invention is to provide for approximately equal distribution of load on the motors of a vehicle, irrespective of whether the diameters of the wheels of the vehicle are equal or unequal.

A further object of the invention is to provide for automatically variably exciting a separately excited motor in such manner as to impart thereto the normal speed-torque characteristic of a series motor.

A still further object of the invention is to provide for varying the excitation of a separately excited traction motor in accordance with the load conditions imposed thereon, whereby the normal speed-torque characteristic of a series motor may be imparted thereto.

A further object of the invention is to provide for the excitation of the field windings of the respective motors of a motor vehicle by means of individual exciter generators and varying the excitation of the exciter generators in accordance with the load conditions imposed on the motors.

It is also an object of the invention to so excite the field windings of the several motors of a motor vehicle that the counter-electromotive forces developed by each motor will be approximately equal even though the diameters of the wheels driven by the motors be unequal.

For a fuller understanding of the invention, reference may be had to the following description taken in conjunction with the accompanying drawing, in which the single figure is a schematic illustration of circuits and apparatus embodying the invention.

In the drawing, a plurality of direct-current traction or propelling motors 1 and 2 are illustrated for propelling a vehicle (not shown).

The motor 1 comprises an armature 3 and a field winding 4. A line switch 5a is provided whereby the armature 3 may be connected to or disconnected from supply conductors 5 and 6, which may be supplied with direct-current voltage from a generator 7.

In order that the field winding 4 of the motor 1 may be separately excited, a motor field-exciter generator 8 is provided. The generator 8 comprises an armature 9 and a field winding 12, the former being connected to the field winding 4 of the motor 1 by conductors 10 and 11. The field winding 12 may be energized from supply conductors 13 and 14 which may be supplied with direct current voltage from an auxiliary direct-current generator 15.

In order that the voltage generated by the motor field-exciter generator 8 may be caused to vary responsive to or in accordance with the load imposed on the motor 1, and thereby vary the electromagnetic field developed by the motor field winding 4, the exciter generator 8 is provided with an auxiliary or series field winding 17. The field winding 17 is connected in series relation with the motor armature 3 across the supply conductors 5 and 6. Therefore, the exciter generator 8 will develop a voltage responsive to the resultant effect of the relatively constant field excitation provided by the field winding 12 and the auxiliary winding 17, the latter being energized in accordance with the current traversing the armature 3 of the motor 1. Because of this compound excitation effect, the field winding 4 of the motor 1 will be energized in accordance with the current traversing its armature, the current through which varies with the load imposed on the motor.

The field winding structure of the motor exciter generator 8 may be so proportioned between separately excited winding 12 and the auxiliary or series winding 17 that, when the motor 1 is operating under light or idling loads, it will develop a speed torque characteristic similar to that of a separately excited motor, but when operating under full or heavy load conditions, this characteristic will be so altered by the effect of the field winding 17, which is connected in series relation with the traction motor armature, that the traction motor 1 will develop a speed-torque characteristic similar to that of a series motor.

The motor 2 is substantially similar to the motor 1 and comprises an armature 18 and a field winding 19. The armature 18 may be connected to or disconnected from the supply conductors 5 and 6 by means of a line switch 21.

In order that the field winding 19 of the motor 2 may be excited in substantially the same manner as the field winding of the motor 1, a motor-field exciter generator 22 is provided. The exciter generator 22 comprises an armature 23 that is connected to the field winding 19 of the motor 2 by conductors 24 and 25, a separately excited field winding 26 and an auxiliary field winding 27 connected in series circuit relation with the armature 18 of the motor 2 across the supply conductors 5 and 6.

As in the case of the exciter generator 8, the respective separately excited and auxiliary or series field windings 26 and 27 may be so proportioned that under light load conditions imposed on the motor 2, the voltage of the generator 22 is developed primarily by the separately excited field winding 26 and, under heavy load conditions, by the field winding 27. Therefore, the motor field winding 19 is energized to impart a separately excited motor speed characteristic to the traction motor 2 under light load conditions. Under heavy load conditions, however, the excitation provided by the auxiliary winding 27 will so effect the excitation of the traction motor 2 as to give it a series motor characteristic.

Because the field windings 12 and 26 of the respective exciter generators 8 and 22 are connected in series relation, the exciting current in these windings will be the same for each generator. Therefore, the components of the voltages impressed on the respective field windings 4 and 19 of the motors 1 and 2 will be substantially equal. Each motor will, therefore, have a field excitation component that remains substantially constant. For this reason the speed of the motors 1 and 2 at light loads will be substantially equal. Obviously, if the wheels driven by the respective motors slip, the speed of the motor armatures will be limited by the constant field excitation component, because the counter electro-motive force developed by the motor armatures will be increased towards a value corresponding to the no-load speed of the motor.

As a definite counter-electromotive force is developed at a given speed by a separately excited motor, the spinning speed of the wheels driven by the motors 1 and 2 will always be definitely limited on a slippery rail under heavy loads. If the slippage occurs at relatively lighter loads on a clean rail, the difference between the spinning and running speeds will be so small at the slippage point of the wheels that the locomotive or vehicle will be creeping along at a speed a trifle less than the lineal speed of the circumference of the wheels. At this point the motors will develop approximately full tractive effort, and the moment the coefficient of friction increases between the rails and wheels the motors will develop full tractive effort. Therefore, the constant field excitation component tends to reduce the torque and the speed of the motors, when slipping of the wheels occurs, to a value at which the wheels will not slip.

When the motors 1 and 2 are operating under full-load conditions, the field excitations of the generators 8 and 22 and of the motors are increased because the field windings 17 and 27 of the generators are connected in series relation with the armatures of the respective motors. Therefore, a voltage is generated by each of the generators 8 and 22 consisting of two components, one being constant and developed by the separately excited windings 12 and 26, and the other being variable and developed by windings 17 and 27. The latter component, of course, varies with the current traversing the armatures of the motors and is determined by the tractive effort developed.

The component of voltage developed by the exciter generators 8 and 22, in response to the excitation provided by the windings 17 and 27, and impressed on the field windings 4 and 19, causes the motors 1 and 2 to tend to divide the load equally between them even though the diameters of the wheels driven thereby are unequal.

If, for example, the motor 1 tends to develop a tractive effort greater than motor 2, then the current through its armature will be increased. However, this increase in armature current will effect an increase in the voltage developed by the exciter generator 8. This voltage increase will increase the excitation of the motor 1 and reduce its speed, because the counter-electromotive force generated in the armature 3 thereof will be increased. Since the speed of motor 1 is reduced and that of motor 2 has not changed, it follows that motor 2 will develop more tractive effort and relieve the motor 1 of some of its load.

In a similar manner, the motor 1 will increase its tractive effort when the motor 2 tends to take more than its share of the load, and the result will be that the motors will divide the load between them in accordance with a series speed-torque characteristic.

In the event that the wheels, driven by the motors 1 and 2, are of unequal diameters, the motors will still tend to divide the load equally between them, because the field excitation for each motor will be such that they will develop substantially equal counter-electromotive forces. For example, if motor 1 is driving the smaller wheels, and motor 2 the larger ones, the tendency will be for the motor 2 to take a larger portion of the load, and the motor 1 a smaller portion. However, this tendency towards unequal division of load cannot mature into a stable condition, because the moment the motor 2 does increase its share of the load, the current through its armature will increase. This increase in armature current effects also an increase in its field excitation, and a corresponding increase in its counter-electromotive force, whereby both the motor speed and tractive effort are reduced. Since the speed of the motor 1 is not reduced, it will develop more tractive effort and relieve the motor 2 of its excess load.

However, when motors 1 and 2 are operating under load, and the diameters of the wheels driven thereby are unequal, the motor driving the smaller wheels will, of course, have a higher speed than the one driving the larger wheels.

Because of this fact, the motor driving the larger wheel, running slower, will carry enough added current so that the increased field resulting from this current will at this slower speed give substantially the same counter-electromotive force as the motor driving the smaller wheels. Thus the effect of the series windings on the separate exciter for each traction motor is to provide a series motor characteristic and very closely divide the load.

By providing the traction motors 1 and 2 with excitation in the manner set forth above, the motors will divide the load satisfactorily, irrespective of the difference in diameters of the wheels because the field excitation is always such that the counter-electromotive forces of the motors are approximately equal. This method of excitation has the further advantage that wheel slippage is greatly diminished. This result occurs because the counter-electromotive force developed, as a result of the constant field excitation produced by the windings 26 and 12, will be so increased when wheel slippage occurs that the motor armatures will reach a limiting speed which they cannot exceed.

In the event that the motors 1 and 2 are not of the same size, the motor field exciter generators 8 and 22 may be so adjusted that the field windings of the motors 1 and 2 will be energized in such manner that the motors will divide the load between them in accordance with their respective capacities. When the generators 8 and 22 have been so adjusted the counter-electromotive forces developed by the motors 1 and 2 will be regulated to cause them to divide the loads in proportion to their respective capacities.

The direction of rotation of the motor armatures 3 and 18 may be controlled by forward-direction switches 28 and 29 and reverse-direction switches 31 and 32 and a drum controller 33. In the particular scheme illustrated, the actuating coils of the respective pairs of switches 28 and 29 and 31 and 32 are connected in series circuit relation with each other across the supply conductors 13 and 14. The drum controller may be utilized also to actuate the line switches 5 and 21.

When the controller 33 is in the off position, the line switches and the direction switches are denergized, but when it is in the forward position a, the actuating coils of the forward-direction switches 28 and 29 are energized to close them. After the controller is set or actuated to the position b, then the actuating coils of the line switches 5a and 21 will be energized to actuate them to their circuit-closing positions.

The energizing circuit for the forward direction switches 28 and 29 for motor 1 may be traced from the supply conductor 14 through conductor 35, contact fingers 36 and 37, bridged by the controller segment 38, junction-point 39, conductor 41 and the coils of the forward-direction switches 28 and 29 for the motor 1 to the supply conductor 13.

The energizing circuit for the forward direction switches 28 and 29 for the motor 2 may be traced from the junction-point 39, through conductor 42 and the coils of the forward direction switches 28 and 29 of the motor 2 to the supply conductor 13. The energizing circuit for the coil of the line switches 21 may be traced from the supply conductor 14 through conductor 35, contact fingers 36 and 43 bridged by the controller segment 38 junction-point 44, the coil of the line switch 21, junction-point 45 and conductor 46 to the supply conductor 13.

The energizing circuit for the line switch 5a may be traced from the junction point 44, through conductor 47, the coil of line switch 5a, the junction point 45 and the conductor 46 to the supply conductor 13.

When the controller 33 occupies or is actuated to position a', the actuating coils for the reverse direction switches 31 and 32 for motors 1 and 2 are energized. Upon the actuation of the controller 33 to position b', the actuating coils for the line switches 5a and 21 are energized. The energizing circuits for the coils of the switches 31 and 32 and 5a and 21 may readily be traced from the auxiliary supply conductor 14 through the controller 33 to the other supply conductor 13 without presenting a detailed description thereof.

The generator 7 comprises an armature 48, a series field winding 49 and a separately excited field winding 51. As shown, the armature 48 and the series field winding 49 are connected to the supply conductors 5 and 6 by conductors 52 and 53 and the separately excited field winding 51 is connected across the supply conductors 13 and 14 by conductors 54 and 55.

Since it is the usual practice to wind motors for railway purposes for 600 volts operating voltage, the generator 7 may be assumed to be wound or designed to generate direct current at 600 volts to thereby provide the supply conductors 5 and 6 with current at this voltage. However, any other suitable voltage may be used.

The auxiliary exciter generator 15 comprises an armature 57, a shunt field winding 58 and a field winding 59 connected in series circuit relation with the armature 57 across the auxiliary supply conductors 13 and 14. Since it is the purpose of the generator 15 to supply current only to the field winding 51 of the generator 7 and the field windings 12 and 26 of the respective motor field exciters 8 and 22, the generator 15 may be so wound that it will generate a voltage of 110 volts to thereby supply the conductors 13 and 14 with current at this voltage. The auxiliary generator 15 may also be utilized for charging a storage battery 61 that is connected across the supply conductors 13 and 14. The purpose of the storage battery will be hereinafter set forth.

As shown in the drawings, the exciter generators 8 and 22, the main generator 7 and the auxiliary generator 15 are all directly connected to a shaft 62 which may be driven by a synchronous motor 63 of the single-phase type. However, it is to be understood that some of the generators, for example, generators 7 and 15, may be driven directly from the motor 63 through the shaft 62, and that the motor field exciter generators 8 and 22 may be driven indirectly by means of gears or other suitable means well known to the art. They may also be driven by separate or individual motors.

The synchronous motor 63 comprises, in general, a wound rotor 64 which may be excited with direct current from the supply conductors 13 and 14 through its slip rings and brushes, and a single phase stator winding 65. The stator winding 65 may be connected for energization to a secondary winding 66 of a single phase transformer 67. The primary winding 68 of the transformer may be connected for energization from a trolley conductor 69, which may be supplied with alternating current voltage of any suitable value, for example, 11,000 volts. The primary winding 68 of the transformer 67 may be connected to or disconnected from the trolley conductor 69 by means of a line switch 70, and the stator winding 65 of the motor 63 may be connected to the secondary winding 66 by means of a switch 71.

For starting purposes, the rotor 64 of the motor 63 is provided with a switch 72 for short-circuiting the rotor winding until the rotor is approximately up to synchronous speed, after which the switch may be opened and direct-current voltage impressed thereon from the supply conductors 13 and 14, by means of a switch 73. In the particular arrangement shown in the drawing, the switch 72 is energized after the switch 73 has been closed, so that the rotor winding 64 will not be open-circuited before direct-current can be impressed on the rotor.

In order that the motors 1 and 2 may be supplied with variable voltage during the starting period of the vehicle, the voltage of the generator 7 may be varied by connecting a resistor 75 in series circuit relation with the separately excited field winding 51 across the supply conductors 13 and 14 and providing short-circuiting switches 76, 77 and 78 for shunting or short-circuiting the respective sections 79, 80 and 81 of the resistor 75. Similarly, the series-connected field windings 12 and 26 of the motor-field-exciter generators 8 and 22 may be connected in series relation with a resistor 83 across the supply conductors 13 and 14. In order that the voltage component of the generators 8 and 22, resulting from the field excitation developed from the series connected windings 12 and 26 thereof, short-circuiting switches 84, 85 and 86 may be provided for shunting or short-circuiting in succession sections 87, 88 and 89, respectively, of the resistor 83.

The short-circuiting switches 76 to 78, inclusive, and 84 to 86, inclusive, may be energized in a predetermined sequence or deenergized by means of a drum controller 90. The controller 90 comprises a segment 91, for controlling the switches 76 to 78, inclusive, a segment 92, for controlling the switches 84 to 86, inclusive, and contact fingers 93 to 100, inclusive. The controller segments 91 and 92 are so arranged that the switches 76 to 78, inclusive, are operated to increase the voltage of the generator 7 and, after the voltage of the generator 7 has been increased to its maximum, the switches 84 and 86 are actuated to decrease the voltage generated by the motor field exciter generators 8 and 22.

For example, when starting the motors 1 and 2 under load, it is desirable that the motors 1 and 2 have a strong field and that the armatures 3 and 18 be supplied with a relatively low voltage. Therefore, in starting, the switches 76 to 78, inclusive, are opened so that the entire resistor 75 is included in the circuit of the field winding 51 to thereby provide the generator 7 with a weak field, and the switches 84 to 86, inclusive, are all closed to short-circuit the entire resistor 83 so that the field windings 12 and 26 are connected directly across the supply conductors 13 and 14. The windings 12 and 26 being connected directly across the conductors 13 and 14, the generators 8 and 22 will develop a relatively high voltage so that the field windings 4 and 19 will be energized to provide the motors with a relatively strong field excitation in starting.

Assuming that the synchronous motor is operating at synchronous speed and that it is desired to start and accelerate the motors 1 and 2, then the drum controller 90 may be actuated from its off position through its various running positions $d$ to $j$, inclusive. When the controller occupies or is actuated to the position $d$, the contact fingers 93 and 94 are bridged by the segment 91 and all of the contact fingers 97 to 100, inclusive, are bridged by the segment 92. Therefore, energizing circuits for the respective actuating coils of the switch 76 and the switches 84 to 86, inclusive, are established.

The energizing circuit for the switch 76 may be traced from the supply conductor 14, through conductor 101, conductor 102, contact fingers 93 and 94—bridged by segment 91—conductors 103 and 104, the actuating coil of the switch 76 and conductors 105 and 46 to the supply conductor 13.

The circuits for the actuating coils of the switches 84 to 86, inclusive, may be traced from the supply conductor 14, through conductor 106, contact fingers 100, 99, 98 and 97, bridged by the controller segment 92, the parallel-connected actuating coils of the switches 84 to 86, inclusive, and conductors 105 and 46 to the supply conductor 13. Therefore, on the first running position $d$ of the controller 90, the switch 76 is closed to short-circuit section 79 of the resistor 75 and the switches 84 to 86, inclusive, are closed to short-circuit the entire resistor 83. The controller having been actuated to its first running position, the generator 7 is provided with a field excitation of such value that a relatively low voltage is supplied to the conductors 5 and 6. However, the excitation of the generators 8 and 22 is such that a relatively high voltage is supplied to the field windings 4 and 19 of the motors.

When the controller 90 is actuated to the positions $e$ and $f$, in succession, the switches 77 and 78 are energized in succession to short-circuit the respective resistor sections 80 and 81, whereby the voltage of the generator 7 is increased step by step until the armatures 3 and 18 of the motors 1 and 2 are supplied with full voltage.

When the controller 90 is actuated to the position $g$, the energizing circuit for the actuating coil of the switch 84 is broken, and section 87 of the resistor 83 is reconnected in series circuit relation with the field windings 12 and 26 of the respective motor field exciter generators 8 and 22 across the conductors 13 and 14. Therefore, the voltage impressed on the windings 4 and 19 of the motors 1 and 2 as a result of the separately excited field windings 12 and 26 and also the speed of the motors 1 and 2 are increased in proportion to the reduction in the field excitation thereof. When the controller 90 is actuated to the positions $h$ and $i$, in succession, the switches 85 and 86 are deenergized in succession to further decrease the field excitation supplied to the generators 8 and 22 by the respective field windings 12 and 26, and the speed of the motors 1 and 2 is further increased. The drum controller 90 is now in its last running position and the motors 1 and 2 are operating at their highest running speed.

It will be readily understood that the controller 90 may be operated in a "step by step" manner in the reverse direction to effect an opposite sequence of operation of switches 76, 77, 78 and 84, 85, 86, and thereby cause regenerative braking to occur. This feature is especially desirable in switching-type locomotives and other vehicles of similar nature the operation of which requires frequent starting, stopping and variable-speed operation.

Since single-phase synchronous motors are not self-starting unless provided with a suitable winding, such motors must be provided with some form of starting means. In the present application, it is proposed to start and accelerate the synchronous motor 63 by means of the generator 7 and the short-circuiting switches 76 to 78, inclusive. Since the generator 7 is wound for 600 volts, it may be connected as a motor directly across the supply conductors 13 and 14, which are at a voltage of approximately 110 volts, without drawing an excessive current from the storage battery 61.

In order to connect the armatures of the generator 7 across the conductors 13 and 14, switches 108 and 109 are provided. In starting the generator 7 as a motor, the switches 76 to 78, inclusive, are closed, so that the generator will have a strong field and thereby reduce the current demand on the battery 61.

In order, therefore, to close the switches 108 and 109 and to actuate the switches 76 to 78, inclusive, to increase the speed of the generator 7 step-by-step, when operating as a motor, to such a value that the single-phase motor 63 will operate as an induction motor, a drum controller 111 is provided.

The controller 111 comprises a segment 112 and a plurality of contact fingers 113 to 121, inclusive. When the controller 111 is actuated from its off position to its first running position $k$, the contact fingers 113 to 117, inclusive, and 121 are bridged by the segment 112, and energizing circuits for the coils of the switches 76 to 78, inclusive, the switches 108 and 109 and the line switch 70, are established. The circuits for the switches 76 to 78, inclusive, may be traced from the supply conductor 14, through the conductor 101, contact fingers 113 to 117, inclusive, bridged by the segment 112, the parallel-connected actuating coils of the switches 76 to 78, inclusive, and conductors 105 and 46 to the supply conductor 13.

The energizing circuits for the switches 108 and 109 may be traced from the supply conductor 14, through conductor 101, contact fingers 113 and 117, bridged by the segment 112, conductor 122, through the actuating coils of the switches 109 and 108 to the supply conductor 13. Therefore, the switches 108 and 109 are closed and the armature 48 of the generator 7 is connected across the supply conductors 13 and 14. Since both the armature 48 and the field winding 51 of the generator 7 are connected to the supply conductors 13 and 14, the armature will start to turn and drive the rotor 64 of the motor 63.

The circuit for the actuating coil of the line switch 70 may be traced from the supply conductor 14, through conductor 101, contact fingers 113 and 121—bridged by the segment 112—the coil of the switch 70 and conductor 123 to the supply conductor 13. Therefore, the switch 70 is closed and the primary winding 68 of the transformer 67 is connected for energization between the trolley 69 and ground at 124.

If the controller 111 is actuated successively through the positions $l$, $m$ and $n$, the switches 76 to 78, inclusive, and 108 and 109 will be deenergized in sequence and the speed of the generator 7 increased to its full running speed.

When the switches 108 and 109 have been deenergized, the switch 71 is closed as soon as the controller 111 has been actuated to the position $n$. The secondary winding of the transformer is, therefore, connected across the stator winding 65 of the motor 63, and the motor will operate as an induction motor to drive the generators 7, 8, 15 and 22 in the manner hereinbefore set forth. Since the motor 63 is operating as an induction motor, (the field winding 64 not yet being energized) it will increase in speed almost to its synchronous speed.

When the controller 111 is actuated to the position $o$, an energizing circuit is established for the switch 73 which may be traced from the supply conductor 14 through conductor 101, contact fingers 113 and 119, bridged by the segment 112, conductor 126, the coil of the switch 73 and the conductor 123 to the supply conductor 13. Upon the closing of the switch 73, a circuit is established for the switch 72 which may be traced from the supply conductor 14, through the contact members of the switch 73, the coil of the switch 72, and conductor 123 to the auxiliary supply conductor 13. The switch 72 being in the open position, and the switch 73 in the closed position, the rotor winding 64 will be connected across the supply conductors 13 and 14, and the motor 63 supplied with direct current excitation. The motor 63 will now pull into step and run at synchronous speed.

The controller 111 is, thereafter, left in its running position so that the motor 63 will operate to drive the generators 7, 8, 15 and 22. The drum controller 90 may now be operated from its off position through its various operating positions as previously described herein.

While a preferred embodiment of the invention has been shown in the drawings and described in the specification, it is to be understood that various modifications may be made in the circuits and apparatus embodied in the invention without departing from the spirit and the scope thereof. Therefore, it is desired that only such limitations shall be placed thereon as are imposed by the prior art and the appended claims.

I claim as my invention:

1. In a control system for motor vehicles provided with a plurality of traction motors for driving the several wheels of the vehicle, in combination, a motor-generator set for supplying variable voltage power to the traction motors, excitation-controlling means for the motors including a separate exciter for each motor responsive to their respective motor-load currents for causing the electromotive forces of the motors to be maintained at a substantially constant ratio, regardless of the differences in the diameters of the wheels, and means for further controlling the excitation and, consequently, the voltage developed by all the exciters, as a group, to control the speed of the motors under light-load conditions and limit the slip speed of any motor in the group.

2. In a control system for motor-operated vehicles, in combination, a plurality of traction motors provided with field and armature windings, an exciter generator connected to each field winding, a source of low-potential direct-current power, a plurality of field windings for each exciter generator, one of the field windings of each exciter generator being connected in series-circuit relation with the armature winding of the traction motor, means for connecting the other of said exciter field windings in series-circuit relation for energization to said source of low-potential direct current power, a source of high-potential direct-current power, means for connecting the armatures of the traction motors to the source of high-potential power, and means for varying the voltage of the low-potential direct-current source applied to the exciter field windings, whereby different speed-torque characteristics are imparted to the traction motors, dependent upon their loads, to cause a predetermined load division.

3. In a train control system, in combination, a plurality of propelling motors each provided with field and armature windings, a source of variable voltage direct-current power for the armatures of said motors, an exciter generator for each of the propelling motors, each exciter generator being provided with two field windings, means for connecting one winding of each of the respective exciter generators in series relation, a source of variable voltage power for said series-connected windings, means for connecting each of the other of said exciter generator windings in series relation with the armatures of the respective traction motors, and means for connecting the respective motor field windings to the armatures of the respective exciter generators.

4. In a control system for motor-operated vehicles, in combination, a plurality of traction motors provided with field and armature windings for actuating the several wheels of the vehicle, a source of power for the motors, an exciter connected to the field winding of each motor, said exciters being provided with a plurality of field windings disposed to be energized from different sources of excitation current, one of the field windings of each exciter being connected in series-circuit relation to the armature of its respective traction motor to vary the exciter voltage in accordance with the motor current, other of said exciter-field windings of all the motors being connected in series-circuit relation to a separate source of excitation current, and means for varying the exciting current in the circuit comprising the series-connected exciter-field windings, whereby two different speed-torque characteristics are imposed upon each traction motor, dependent upon the amount of load carried by each motor.

5. In a control system for motor-operated vehicles, in combination, a plurality of motors for actuating the wheels of the vehicle, said motors being provided with separately excited field windings, a separate exciter for each motor, said exciters being connected in closed-circuit relation with the field windings of their respective motors, means for simultaneously varying the excitation of all the exciters to vary one component of motor-field excitation, and means individually responsive to the load on each motor for causing the exciters to automatically vary another component of motor-field excitation, thereby to provide a predetermined motor characteristic under light-load conditions to control the slip speed of the motors and a different motor characteristic under load conditions to control the division of load between the motors.

6. In a control system for motor-operated vehicles, in combination, a plurality of motors for actuating the wheels of the vehicle, said motors being provided with armature and field windings, a source of power for the motors, the motors being independently connected to the power source, an exciter connected in closed-circuit relation to the field winding of each motor, said exciters having main and auxiliary field windings, the main field windings of the exciters being connected in series-circuit relation, a source of excitation voltage, means for controlling the exciting current in the series-connected field circuit to control the separately-excited characteristics of the motors, and means for exciting the auxiliary field windings of the exciters in accordance with the load variations on each motor, to superimpose a series speed-torque characteristic upon the separately excited characteristic, thereby to cause the several motors to maintain a predetermined division of load regardless of the ratio of their speeds.

7. In a control system for motor-operated vehicles, in combination, a plurality of motors for propelling the vehicle, said motors being provided with separately excited field windings, a source of variable-voltage power for the motors, an exciter connected in closed-circuit relation to the field winding of each motor, said exciters being provided with main and auxiliary field windings, means including a master switch for simultaneously controlling the excitation of the main field windings of all the exciters to provide a minimum degree of excitation for the motors to limit their operating speeds to a predetermined value under light-load conditions, and means for separately controlling the excitation of the auxiliary field windings of each exciter in accordance with the load variations of their respective motors to impose a variable component of field excitation on the motors, thereby to balance the load between the motors in a predetermined ratio.

8. In a motor-control system for motor-operated vehicles, in combination, a plurality of motors for driving the several wheels of the vehicle, a source of power for the motors, said motors being provided with separately excited field windings, a variable-voltage exciter for each field winding, said exciters being provided with main and auxiliary field windings, said auxiliary field winding of each exciter being connected in the armature circuit of its respective motor to cause a variation in the field excitation of the motors in response to changes in load, and means for simultaneously varying the excitation of the main field windings of all the exciters to provide a minimum field excitation for the several motors uninfluenced by load conditions, thereby to impart series motor characteristics to the motors when they are loaded and to limit their slip speed to a definite predetermined value regardless of the load under slip conditions.

9. In a control system for motor-operated vehicles, in combination, a plurality of motors for actuating the several wheels of the vehicle, a variable-voltage generator provided with a field winding for supplying power to the motors, means for driving the generator, a separately driven exciter for each motor, said exciters being provided with main and auxiliary field windings and having their armatures connected to the field winding of their respective motors, the auxiliary field windings of the exciters being connected in the motor circuits to vary the excitation of the motors in accordance with load changes, the main field windings being connected in series-circuit relation to a source of excitation voltage, an energizing circuit for the generator field winding connected to the same source of excitation voltage, and means for controlling the current flowing in both the generator and exciter field circuits, whereby the motors may be caused to develop traction power to operate the vehicle, and to regenerate power to retard the vehicle when slowing down under the influence of its momentum.

In testimony whereof, I have hereunto subscribed my name this 13th day of August 1928.

NORMAN W. STORER.